(12) United States Patent
Yourkowski et al.

(10) Patent No.: US 7,578,466 B2
(45) Date of Patent: Aug. 25, 2009

(54) MECHANISM FOR REDUCING HEAT GENERATION IN A JOINT

(75) Inventors: Frank M. Yourkowski, Renton, WA (US); Mitchell L. Mellor, Bothell, WA (US)

(73) Assignee: The Boeing Company, Chicago, IL (US)

( * ) Notice: Subject to any disclaimer, the term of this patent is extended or adjusted under 35 U.S.C. 154(b) by 412 days.

(21) Appl. No.: 11/326,754

(22) Filed: Jan. 6, 2006

(65) Prior Publication Data

US 2007/0158496 A1 Jul. 12, 2007

(51) Int. Cl.
*B64C 25/10* (2006.01)

(52) U.S. Cl. .............................. 244/102 A; 244/100 R; 244/102 R; 244/103 R (58) Field of Classification Search ............. 244/100 R, 244/102 A, 102 R, 103 R; 301/124.1, 137; 403/160, 161
See application file for complete search history.

(56) References Cited

U.S. PATENT DOCUMENTS

| | | | | |
|---|---|---|---|---|
| 312,898 A * | 2/1885 | Read | ........................... | 160/82 |
| 387,444 A * | 8/1888 | Poulson | ...................... | 403/161 |
| 2,490,485 A * | 12/1949 | Spaeth | .................... | 244/102 R |
| 2,699,302 A * | 1/1955 | Whitaker | ................ | 244/103 R |
| 2,943,820 A * | 7/1960 | Westcott, Jr. | ................. | 244/50 |
| 2,958,400 A * | 11/1960 | Gilbert | ........................ | 188/287 |
| 3,322,376 A * | 5/1967 | Neilson et al. | .......... | 244/102 R |
| 3,784,131 A * | 1/1974 | Stratford | ................. | 244/102 R |
| 3,845,919 A * | 11/1974 | Jenny | ..................... | 244/103 R |
| 4,328,939 A * | 5/1982 | Davies et al. | ........... | 244/102 R |
| 4,345,727 A * | 8/1982 | Brown et al. | ............ | 244/102 R |
| 4,720,063 A * | 1/1988 | James et al. | ............ | 244/102 R |
| 6,409,121 B1 * | 6/2002 | Lindahl | .................. | 244/100 R |

* cited by examiner

*Primary Examiner*—Michael R Mansen
*Assistant Examiner*—Philip J Bonzell
(74) *Attorney, Agent, or Firm*—Rozenblat IP LLC (57) ABSTRACT

The invention relates to mechanisms for reducing heat generation in a pivot joint, and to methods for their use. The mechanism may be designed to average relative velocities of a pin with respect to velocities of first and second members joined by the pin. The mechanism may comprise at least one linked member adapted to rotate the pin simultaneously with respect to both the first and second members. In such manner, the heat generated in the joint may be reduced, thereby decreasing the likelihood of failure of one or more of the joint's parts.

7 Claims, 6 Drawing Sheets

FIG. 7

MECHANISM FOR REDUCING HEAT GENERATION IN A JOINT

BACKGROUND OF THE INVENTION

Pivot joints are often used in airplanes and other applications to rotate-ably connect two members using a pin extending through portions of both members. In any pivot joint connecting multiple members, there may be problems with frictional heat damage to the pin, and members being connected, due to high pressure and high rotational velocities. Some previous methods to reduce heat generation in pivot joints have focused on improving lubrication to reduce friction, and reducing bearing pressure by increasing surface areas. Methods to improve lubrication in pivot joints have been partly successful. However, these methods may require additional and frequent maintenance. Failure to follow the prescribed lubrication regimen may allow heat damage to occur.

Some other methods to reduce heat generation in pivot joints have involved attempting to reduce the total pivot motion in the joint by dampening the oscillation of one or more of the members being joined. Methods to dampen oscillation have been successful in part, but require large, heavy, and/or expensive damping systems which may not have the desired efficiencies. Mechanisms, and methods for their use, are needed for reducing heat generation to alleviate one or more of the problems of the existing pivot joints.

SUMMARY OF THE INVENTION

In one aspect of the invention, a mechanism for reducing heat generation in a pivot joint comprises a first member, a second member, a pin connecting the first and second members, and a plurality of linked members. At least one of the linked members is connected to the pin. The mechanism is adapted so that whenever the pin is rotated, the pin is simultaneously rotated relative to both of the first and second members.

In another aspect of the invention, an apparatus is provided for averaging relative velocities of a pin with respect to velocities of first and second members joined by the pin. The apparatus comprises at least one linked member adapted to rotate the pin simultaneously with respect to both of the first and second members.

In a further aspect of the invention, a method of reducing heat generation in a pivot joint is provided. A pin connecting first and second members is provided. Whenever the pin is rotated, the pin is rotated simultaneously with respect to both of the first and second members.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
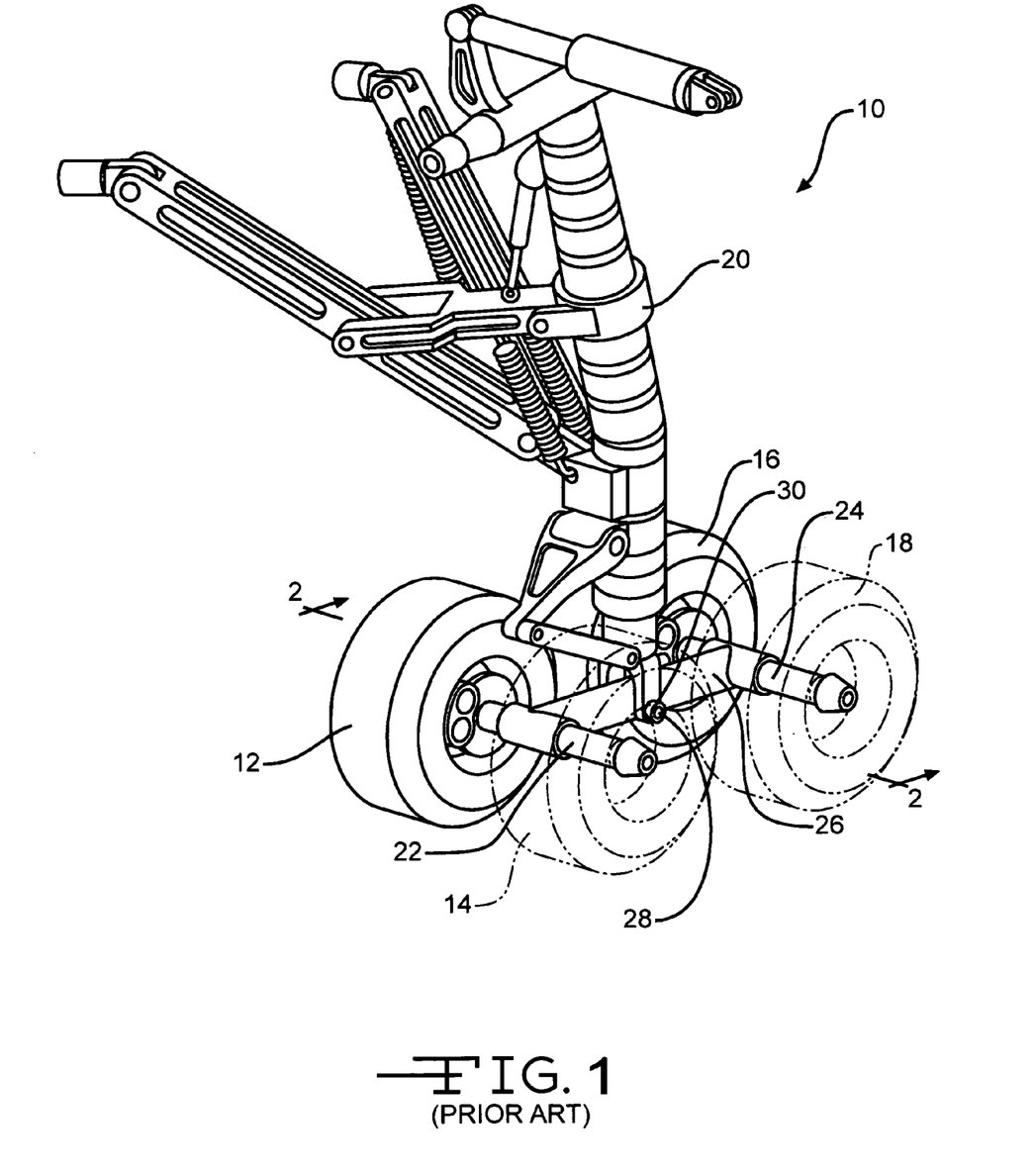
FIG. 1 is an isometric view of a prior art twin tandem landing gear in a 767 airplane.

FIG. 1 depicts one embodiment of a prior art twin-tandem landing gear leg 10 in a 767 commercial airplane. Many large commercial airplanes use landing gears having this twin tandem arrangement with four wheels 12, 14, 16, and 18 per landing gear leg member 20. In this arrangement, as shown, two wheels 12 and 14 may be attached to a forward axle 22, while two wheels 16 and 18 may be attached to an aft axle 24. The forward and aft axles, 22 and 24, are typically connected by a truck beam member 26, which may also be referred to as a bogie beam. The truck beam member 26 may be connected to the landing gear leg member 20, also referred to as a landing gear post member or shock strut member, by a pivot pin 28. The pivot joint 30, comprising the combination of the truck beam member 26, shock strut member 20, and pivot pin 28, may allow the truck beam 26 to pitch to a desired orientation for retraction and/or landing, and also may allow the truck beam member 26 to pitch to conform to uneven or rough runway surfaces.

Figure 2:
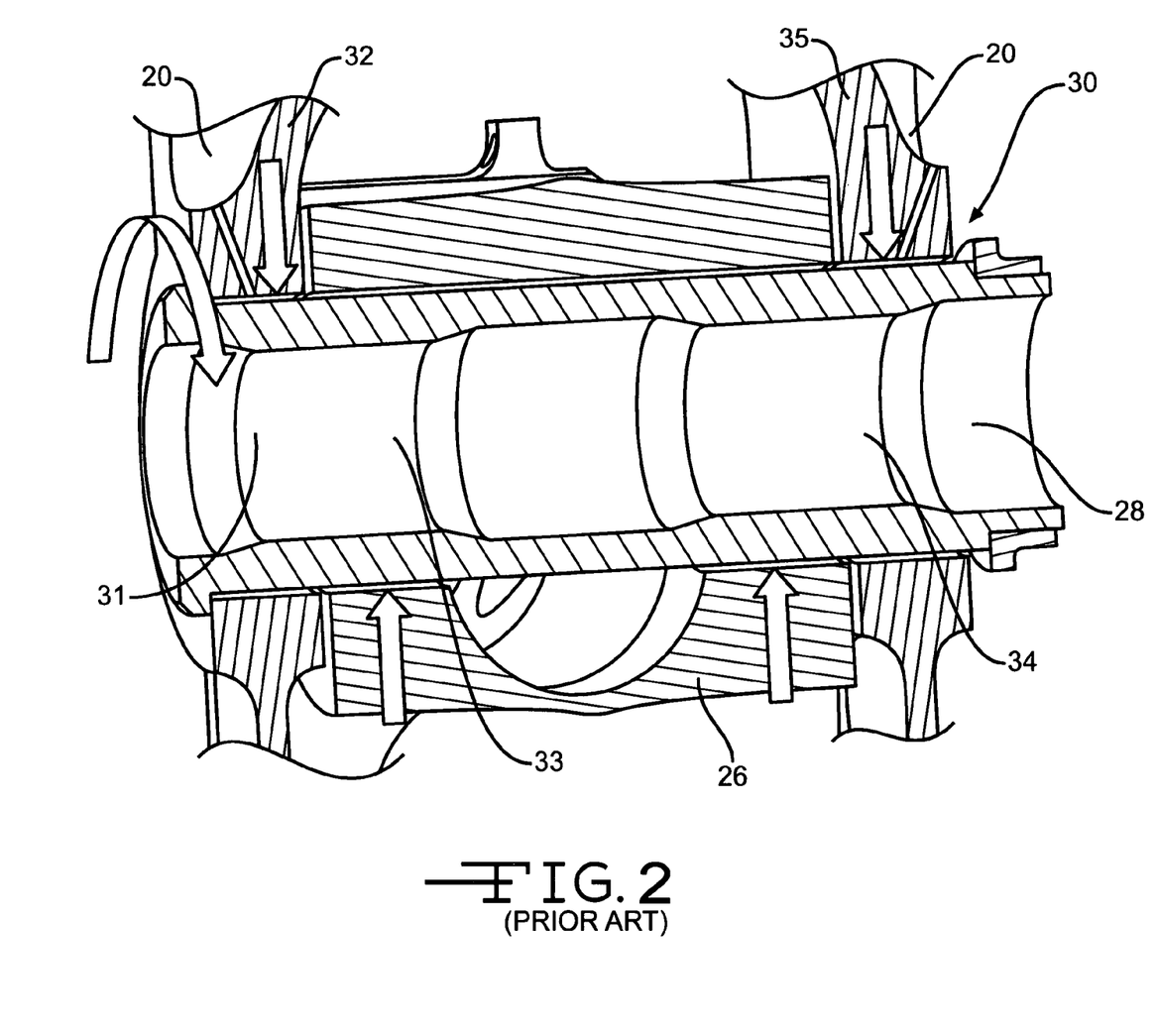
FIG. 2 shows a partial cross-sectional view along line 2-2 of the joint in FIG. 1.

FIG. 2 shows a partial cross-sectional view of the pivot joint 30 along line 2-2 of FIG. 1. As shown, the pin 28 extends through a hole 31 in one leg 32 of the shock strut member 20, through a hole 33 in the truck beam member 26, and through a hole 34 in another leg 35 of the stock strut member 20. The pivot pin 28 is free to rotate with respect to the shock strut member 20 or the truck beam member 26. Bushings (not shown) may be utilized to aid the rotation of the pivot pin 28. In practice, the pin 28 may rotate with respect to whichever one of the shock strut member 20 or truck beam member 26 has the lowest frictional resistance, and may be stationary with respect to the other remaining truck beam member 26 or shock strut member 20 which has the higher frictional resistance. It may be difficult to predict which one of the truck beam member 26 or shock strut member 20 will have the lowest frictional resistance, and circumstances may change under different loading conditions.

When taking off or landing from excessively rough or uneven runways the truck beam member 26 may pitch an excessive amount in order to conform to the uneven runway surface. Excessive pitching may cause heat build up in the pivot joint 30. The total heat generated in the pivot pin joint 30 is a function of the friction in the joint 30, the bearing pressure in the joint 30, the pitch velocity, the total pivot motion, and the total time of the resistance. Excessive heat buildup may weaken the pivot joint 30 components, including the truck beam member 26, pivot pin 28, and shock strut member 20, and may cause one or more of the parts to fail. Heat damage has occurred on truck beam members 26, pivot pins 28, shock strut members 20, and various other parts on 747, 757 and 767 airplanes.

The present invention may be designed to reduce the total heat generated at one or more areas in the pivot pin joint 30, including the truck beam member 26, pivot pin 28, and shock strut leg member 20, in order to reduce the likelihood of part failure. This may be accomplished by utilizing a mechanism under the invention to ensure that the pivot pin 28 is rotated simultaneously with respect to both the shock strut leg member 20 and truck beam member 26. In such manner, the situation which may occur in the prior art, where the pivot pin 28 may only rotate with respect to one of the shock strut leg member 20 or the truck beam member 26 while staying stationary with respect to the other part, may be avoided. As a result, the invention may allow a reduction in frictional heat created by the pin 28 at one or more areas in the pivot pin joint 30 by balancing the frictional heat between the shock strut leg member 20 and truck beam member 26.

Figure 3:
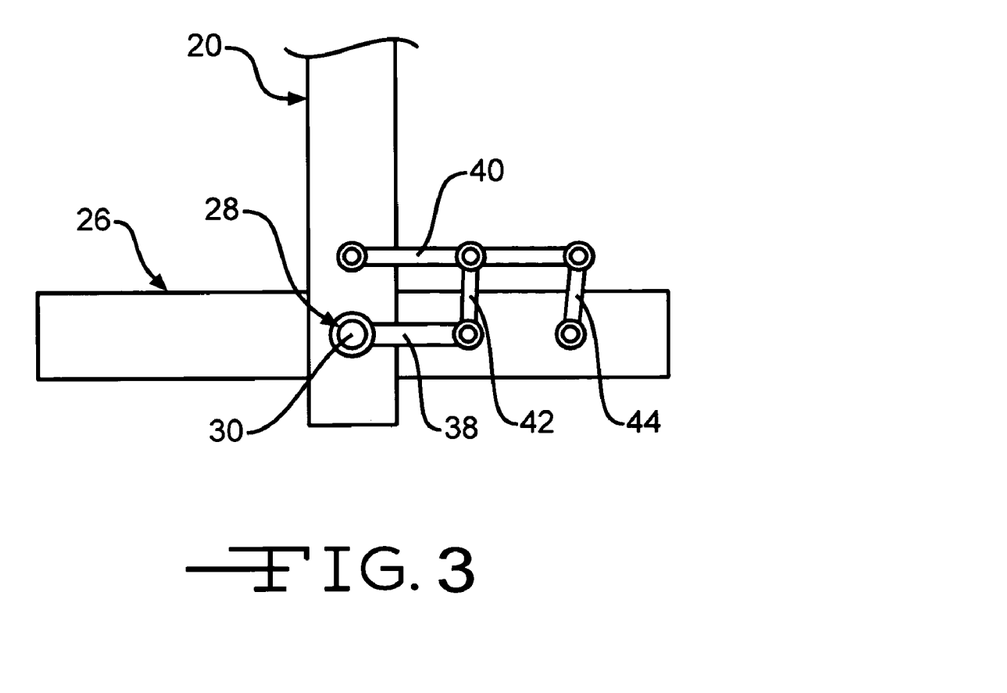
FIG. 3 shows a side view of one embodiment of a mechanism under the invention in a first position.
Figure 4:
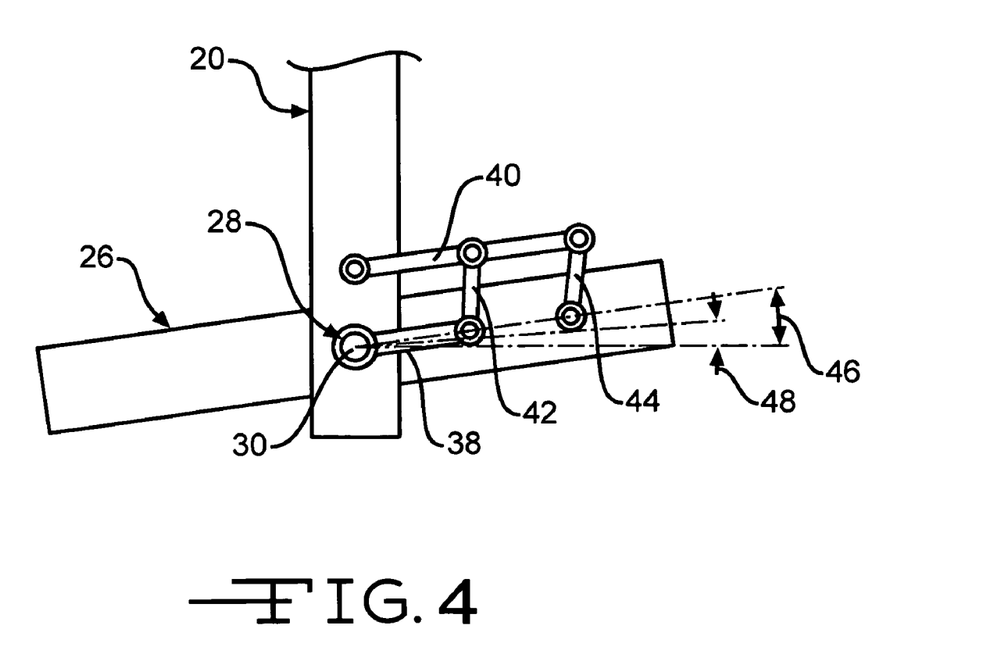
FIG. 4 shows a side view of the embodiment of FIG. 3 in a second position.

FIG. 3 shows one embodiment of a mechanism under the invention being applied to a truck beam member 26 of an airplane in a first position relative to a shock strut member 20, with the pivot pin 28 connecting the truck beam member 26 and shock strut member 20. FIG. 4 shows the same mechanism as in FIG. 3 being applied with the truck beam member 26 in a second position relative to the shock strut member 20. As shown in FIGS. 3 and 4, one embodiment of the mechanism may comprise four linked members 38, 40, 42, and 44, each made of high strength steel or other material known in the art. Linked member 38 may be rigidly attached to the pivot pin 28 so that linked member 38 is forced to rotate the same amount as the pivot pin 28. The linked member 38 may be bolted to the pivot pin 28, integrally molded to the pivot pin 28, or attached in any other manner known in the art. Linked member 40 may be rotate-ably attached to the shock strut member 20 so that it may rotate with respect to the shock strut member 20. The linked member 40 may be rotate-ably attached utilizing a pin, bearing, or through any other manner known in the art. Linked member 42 may be rotate-ably attached to linked members 38 and 40 so that it may rotate relative to both. The linked member 42 may be rotate-ably attached utilizing pins, bearings, or through any other manner known in the art. Linked member 44 may be rotate-ably attached to truck beam member 26 and linked member 40 so that it may rotate relative to both. The linked member 44 may be rotate-ably attached utilizing pins, bearings, or through any other manner known in the art.

As the truck beam member 26 pitches from one position to the next, as shown in FIGS. 3 and 4, the relative motion between the truck beam member 26 and the shock strut member 20 may cause linked members 40 and 44 to move in predetermined patterns. Moreover, as linked members 40 and 44 move, they may force linked members 38 and 42 to move in predetermined patterns. Due to linked member 38 being rigidly attached to the pivot pin 28, the motion of linked member 38 may cause the pivot pin 28 to rotate as shown. The relative size, shape, configuration, and orientation of the linked members, 38, 40, 42, and 44, may be chosen to give the desired rotation ratios between the rotation 46 of the truck beam member 26 and the rotation 48 of the pivot pin 28. For instance, in FIGS. 3 and 4, the size, shape, configuration, and orientation of the linked members, 38, 40, 42, and 44, have been selected so that when the truck beam member 26 pitches, the truck beam rotation 46 will be substantially equivalent to double the amount of pin rotation 48. In other embodiments, the size, shape, configuration, and/or orientation of the linked members, 38, 40, 42, and 44, may be selected to produce other pre-determined ratios between the pin rotation 48 and truck beam rotation 46.

Driving the pivot pin 28 with this mechanism may divide the relative motion of the pivot pin 28 between the shock strut member 20 and the truck beam member 26. When viewed with respect to the pivot pin 28, the shock strut member 20 and the truck beam member 26 may rotate in equal but opposite directions. The friction generated in the joint 30 may create torsional moment. The opposite acting torsional loads in the pivot pin 28 may tend to offset one another. Because the torsional loads may tend to offset one another, the loads in the mechanism may be lowered. Use of the linked members, 38, 40, 42, and 44, may ultimately produce lower frictional heat at one or more locations in or around the pin 28 by forcing the pin 28 to rotate simultaneously with respect to both the shock strut member 20 and the truck beam member 26, thereby balancing the frictional heat between the separate interface locations of the shock strut member 20 and truck beam member 26. The total pin rotation 48 may be reduced to provide a lower relative pin velocity with respect to the truck beam 26 and shock strut member 20. In FIGS. 2 and 3, the total relative pin rotation 48 has been cut in half, reducing the pin's relative velocity in half, which may result in a reduction in heat generation. The likelihood of part failure may be reduced. The mechanism may reduce motion in the joint 30 by twenty-five percent. This reduction may be equivalent to hydraulic dampener scenarios that weigh three times as much.

Figure 5:
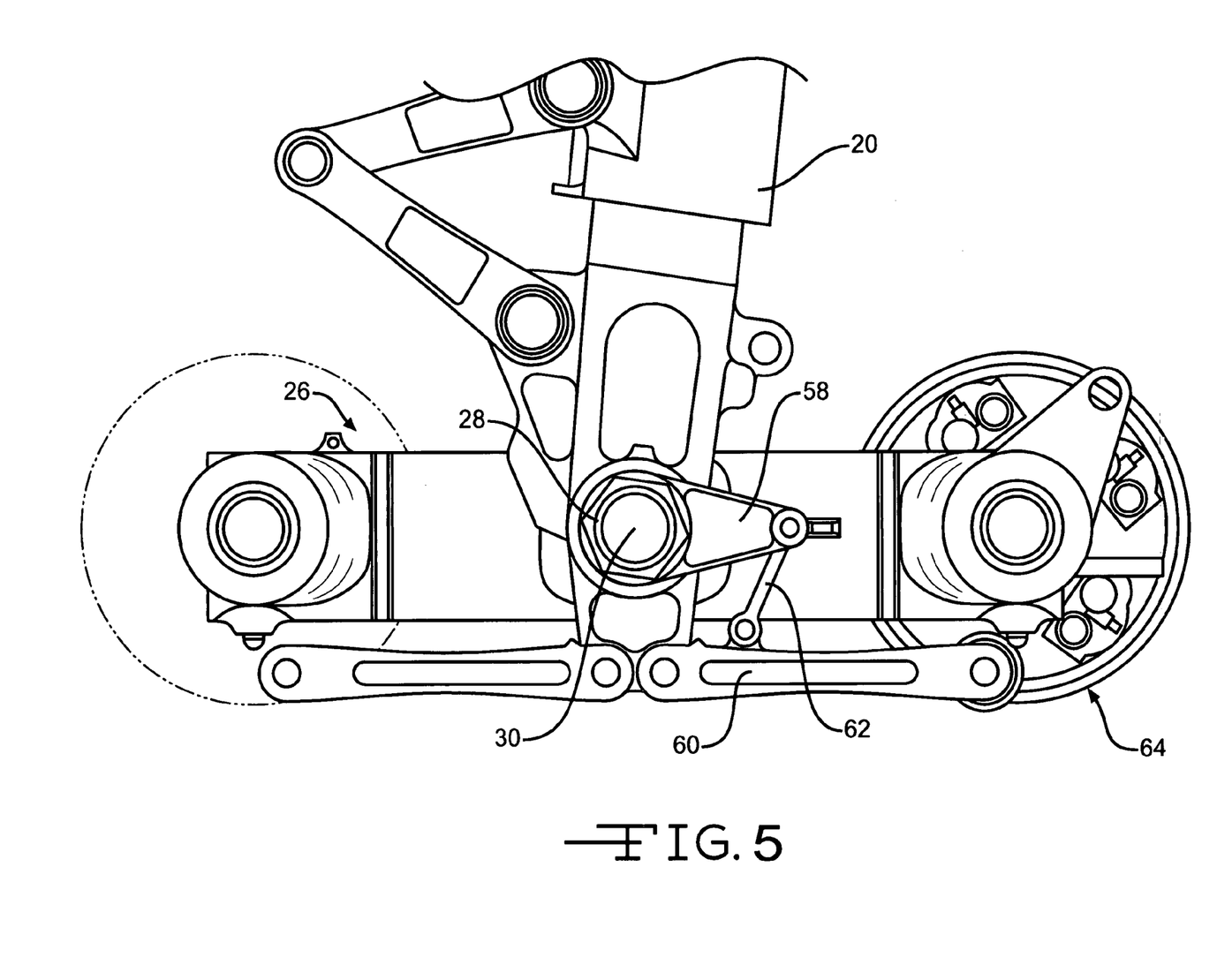
FIG. 5 shows a side view of another embodiment of a mechanism under the invention in a first position.
Figure 6:
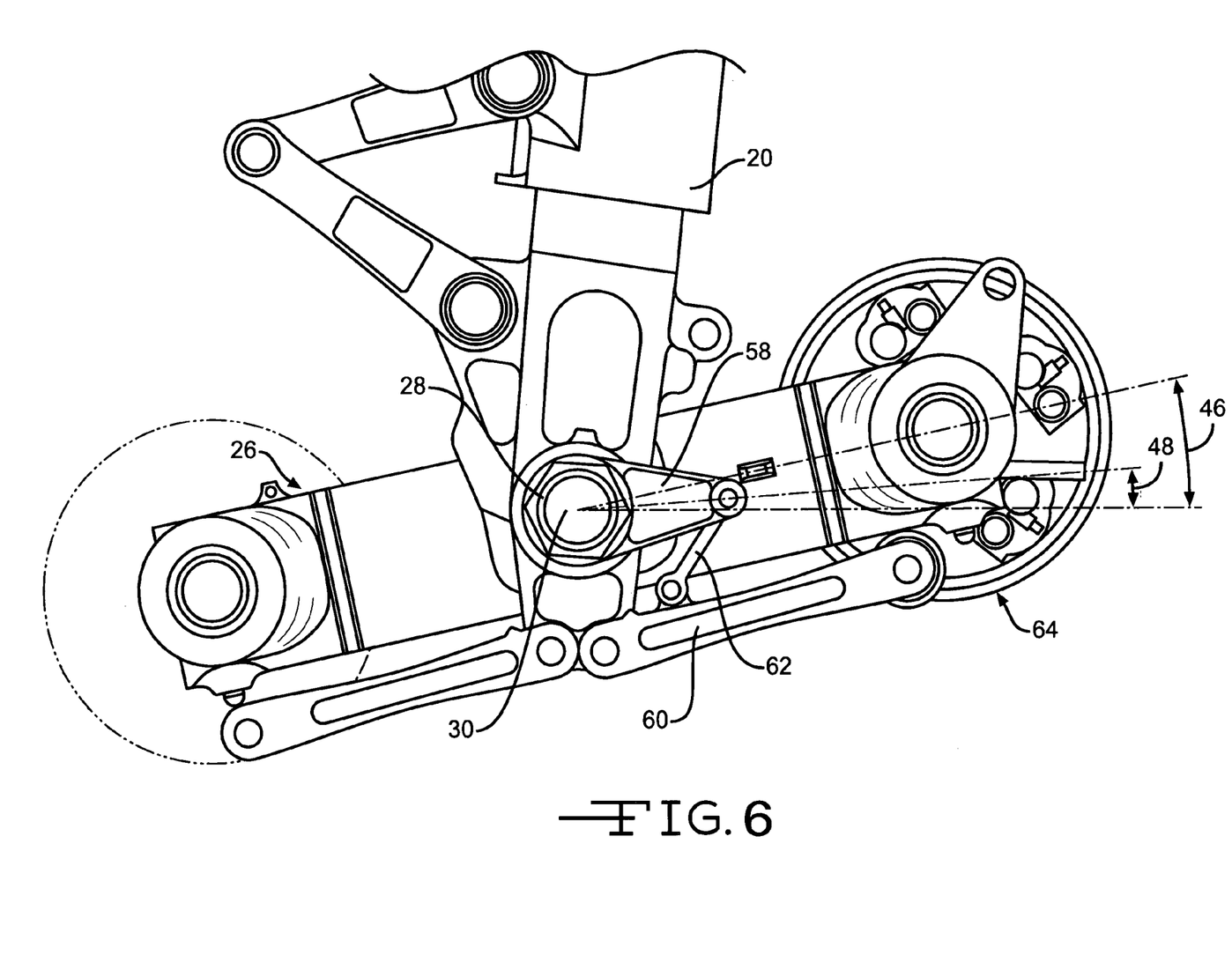
FIG. 6 shows a side view of the embodiment of FIG. 5 in a second position.

FIGS. 5 and 6 depict another embodiment of a mechanism under the invention being applied to a 787 commercial airplane with the truck beam 26 in one position in FIG. 5 and in another position in FIG. 6. As shown, linked member 58 may be rigidly attached to the pivot pin 28 so that linked member 58 is forced to rotate the same amount as the pivot pin 28. The linked member 58 may be bolted to the pivot pin 28, integrally molded to the pivot pin 28, or attached in any other manner known in the art. Linked member 60, which may comprise a brake rod, may be rotate-ably attached to the shock strut member 20 to allow it to rotate with respect to the shock strut member 20. Linked member 60 may be rotate-ably attached utilizing a pin, bearing, or through any other manner known in the art. Linked member 62 may be rotate-ably attached to linked members 58 and 60 so that it may rotate relative to both. The linked member 62 may be rotate-ably attached utilizing pins, bearings, or through any other manner known in the art. Linked member 64, which may comprise a brake, may be rotate-ably attached to truck beam member 26 and linked member 60 so that it may rotate relative to both. The linked member 60 may be rotate-ably attached utilizing pins, bearings, or through any other manner known in the art.

As the truck beam member 26 pitches from one position to the next, the relative motion between the truck beam member 26 and the shock strut member 20 may cause linked members, 58, 60, 62, and 64, to move in predetermined patterns. Due to linked member 58 being rigidly attached to the pivot pin 28, the motion of linked member 58 may cause the pivot pin 28 to rotate as shown. The relative lengths and configurations of the linked members, 58, 60, 62, and 64, may be chosen to give the desired rotation ratios between the rotation 46 of the truck beam 26 and the rotation 48 of the pivot pin 28 in order to reduce heat generated within one or more locations in the joint 30.

Figure 7:
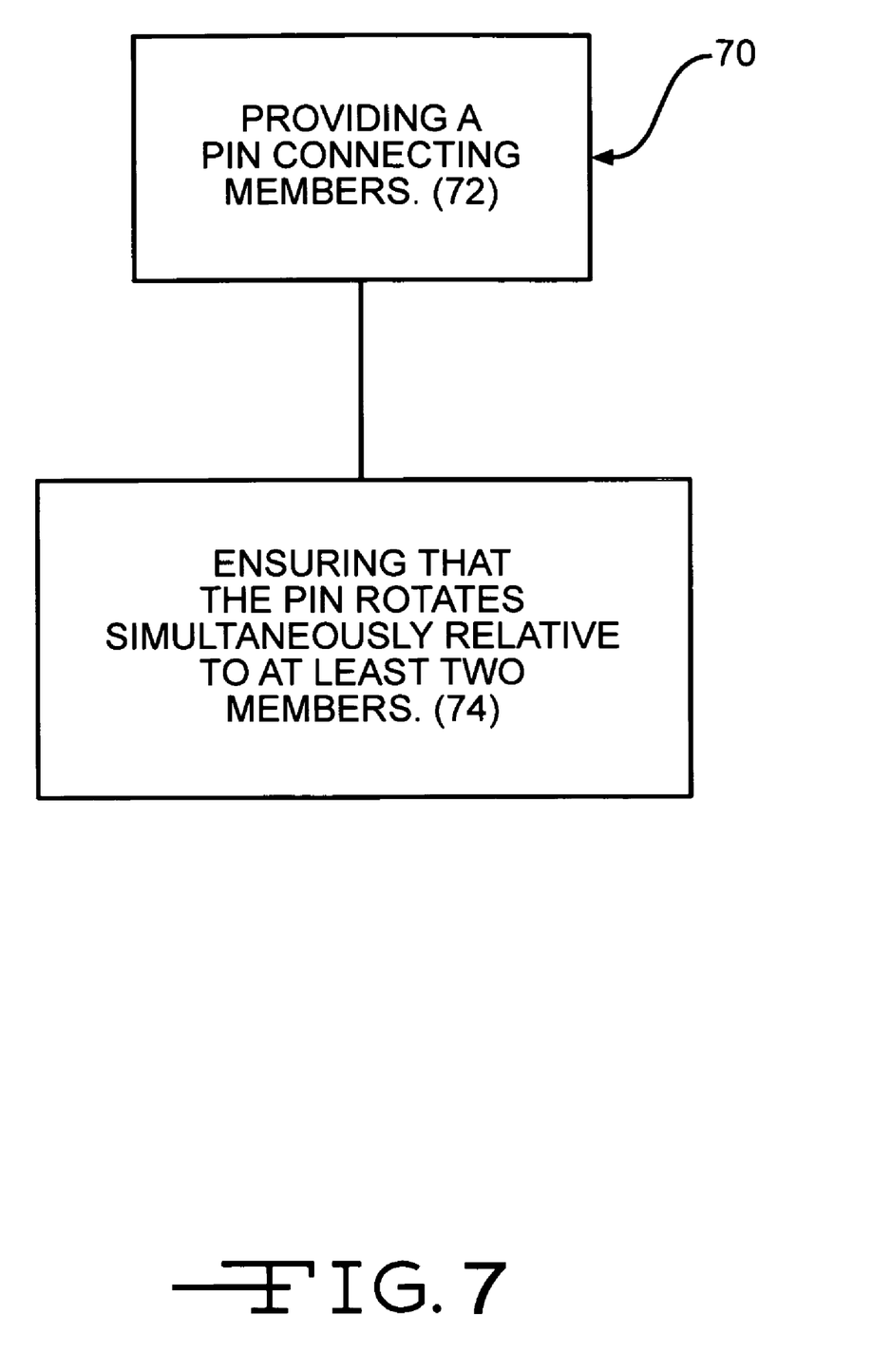
FIG. 7 depicts an embodiment of a method under the invention for reducing heat generation in a pivot joint.

FIG. 7 depicts an embodiment 70 of a method under the invention for reducing heat generation in a pivot joint. In step 72, a pin is provided which connects a plurality of members. The members may comprise a truck beam member and a shock strut member. In other embodiments, the members being used may vary. In step 74, it is ensured that whenever the pin is rotated, the pin is rotated simultaneously with respect to at least two of the plurality of members. This step may be achieved using at least one linked member. In other embodiments, other mechanisms may be utilized.

The invention may be implemented on a forward brake rod, aft brake rod, or other part of an airplane. Mechanisms under the invention may be utilized on one or two sides of a truck beam member 26 in order to reduce loads. By using an existing shock strut member 20, truck beam member 26, and brake 64 of a commercial airplane, the number of components required to implement the invention may be reduced. In many cases, the shock strut member 20, truck beam member 26, and brake 64 may have sufficient structural capability to handle the additional load imparted by the mechanism. As a result, a mechanism under the invention may be added to an existing dual tandem landing gear with minor modification. For instance, a mechanism under the invention may be offered for sale as an aftermarket retrofit kit that includes a pivot pin 28, brake rod 60, linked members 58 and 62, and associated fasteners. In other embodiments, the invention may comprise a non-retrofit device.

The mechanism of the invention may comprise other embodiments beyond linked members to ensure that whenever the pin 28 is rotated, the pin 28 may be rotated simultaneously with respect to two or more members connected by the pin 28. The invention may be used in conjunction with any type of airplane, including, amongst others, dual tandem gears on the 787, 757, 767, 707, A300, A330/340, DC-8, L-1011, and 747. The invention may also be utilized in non-landing gear and/or non-airplane related applications. For instance, the invention may be applied in any pivot joint where heat damage due to high bearing pressures and high rotational velocities may be an issue.

It should be understood, of course, that the foregoing relates to exemplary embodiments of the invention and that modifications may be made without departing from the spirit and scope of the invention as set forth in the following claims.

We claim:

1. An aircraft mechanism for reducing heat generation in a pivot joint comprising:
   a first member;
   a second member;
   a pivot pin connecting said first and second members to allow said first and second members to oscillate relative to one another about said pivot pin; and
   a plurality of linked members, wherein one of said linked members is rotate-ably attached to said first member, another of said linked members is rotate-ably attached to said second member, another of said linked members is rigidly connected to said pin, and each of the linked members are rotate-ably linked to one another;
   wherein said rigidly connected linked member is adapted to rotate a same amount as said pin when said first and second members oscillate relative to one another about said pivot pin causing each of the linked members to rotate relative to one another and to rotate relative to the first and second oscillating members;
   wherein said mechanism is adapted so that when said first and second members oscillate about said pin, said pin is simultaneously rotated relative to both of said first and second members as a result of the linked members thereby reducing heat generation in the pivot joint;
   wherein said mechanism is adapted so that when said second member rotates about said pin, said pin rotates in an amount substantially equal to half of the rotation of said second member
   wherein said plurality of linked members provide reduced rotational velocities of said pin relative to said first and second members thereby reducing heat generation in the pivot joint.

2. The aircraft mechanism of claim 1, wherein said mechanism is used for reducing heat generation in an airplane.

3. The aircraft mechanism of claim 2, wherein said first member is a shock strut.

4. The aircraft mechanism of claim 2, wherein said second member is a truck beam.

5. The aircraft mechanism of claim 2, wherein one of said plurality of linked members is a brake-rod and another of said plurality of linked members is a brake.

6. The aircraft mechanism of claim 1, wherein said plurality of linked members comprise four linked members.

7. The aircraft mechanism of claim 6, wherein said first linked member is rigidly connected to said pin, said second linked member is rotate-ably attached to said first member, said third linked member is rotate-ably attached to said second member, and said fourth linked member is rotate-ably linked to both of said first and second linked members.

* * * * *

UNITED STATES PATENT AND TRADEMARK OFFICE
CERTIFICATE OF CORRECTION

PATENT NO. : 7,578,466 B2 Page 1 of 1
APPLICATION NO. : 11/326754
DATED : August 25, 2009
INVENTOR(S) : Yourkowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Seventh Day of September, 2010

David J. Kappos
*Director of the United States Patent and Trademark Office*